(12) United States Patent
Last

(10) Patent No.: US 10,329,041 B2
(45) Date of Patent: *Jun. 25, 2019

(54) SYSTEM AND METHOD FOR THE ASSEMBLY AND COLLECTION OF NON-FILLED SPOUTED POUCHES

(71) Applicant: IPN IP B.V., Houten (NL)

(72) Inventor: Laurens Last, Bosch En Duin (NL)

(73) Assignee: Scholle IPN IP BV (NL)

( * ) Notice: Subject to any disclaimer, the term of this patent is extended or adjusted under 35 U.S.C. 154(b) by 655 days.

This patent is subject to a terminal disclaimer.

(21) Appl. No.: 14/785,593

(22) PCT Filed: Apr. 19, 2013

(86) PCT No.: PCT/NL2013/050297
§ 371 (c)(1),
(2) Date: Oct. 19, 2015

(87) PCT Pub. No.: WO2014/171814
PCT Pub. Date: Oct. 23, 2014

(65) Prior Publication Data
US 2016/0083124 A1    Mar. 24, 2016

(51) Int. Cl.
| | | |
|---|---|---|
| *B25J 11/00* | (2006.01) | |
| *B65B 35/24* | (2006.01) | |
| *B65B 5/06* | (2006.01) | |
| *B65B 5/10* | (2006.01) | |
| *B65B 61/20* | (2006.01) | |

(Continued)

(52) U.S. Cl.
CPC ............ *B65B 43/12* (2013.01); *B25J 11/00* (2013.01); *B25J 15/0066* (2013.01); *B65B 5/06* (2013.01); *B65B 5/08* (2013.01); *B65B 5/105* (2013.01); *B65B 35/24* (2013.01); *B65B 43/44* (2013.01); *B65G 37/00* (2013.01); *B65G 47/905* (2013.01); *B65G 47/907* (2013.01); *B65G 57/00* (2013.01); *B31B 70/844* (2017.08); *B31B 70/92* (2017.08); *B31B 70/98* (2017.08); *B65B 43/00* (2013.01); *B65B 2220/16* (2013.01); *Y10S 901/02* (2013.01); *Y10S 901/47* (2013.01)

(58) Field of Classification Search
CPC ....... B31B 70/92; B31B 70/98; B31B 70/844; B65B 43/00; B65B 43/12; B65B 43/44; B65B 5/06; B65B 5/08; B65B 5/105; B65B 5/10; B65B 35/18; B65B 35/24; B25J 11/00; B25J 15/0066
USPC .................................. 53/410, 133.2
See application file for complete search history.

(56) References Cited

U.S. PATENT DOCUMENTS 3,891,779 A * 6/1975 Robinson .................. A23L 3/02
422/28
5,175,014 A * 12/1992 Brockwell ............ A01J 25/162
426/512

(Continued)

*Primary Examiner* — Andrew M Tecco
*Assistant Examiner* — Nicholas Igbokwe
(74) *Attorney, Agent, or Firm* — The Watson IP Group, PLC; Jovan N. Jovanovic

(57) ABSTRACT

Method and system for the assembly and collection of non-filled spouted pouches (10) to be transported to a remote filling device. According to the invention, a pick and place robot system (25) is provided comprising a camera system (11) on the basis of which a gripping device (28) is operable to pick up the spouted pouches, and a robot arm (29) is operable to transport the spouted pouches to a storage rail (21), wherein the gripper can place the spouted pouches.

21 Claims, 9 Drawing Sheets

(51) Int. Cl.
    *B65G 37/00*      (2006.01)
    *B65G 57/00*      (2006.01)
    *B65B 43/12*      (2006.01)
    *B65B 5/08*      (2006.01)
    *B25J 15/00*      (2006.01)
    *B65G 47/90*      (2006.01)
    *B65B 43/44*      (2006.01)
    *B65B 43/00*      (2006.01)
    *B31B 70/92*      (2017.01)
    *B31B 70/98*      (2017.01)
    *B31B 70/84*      (2017.01)

(56) References Cited

U.S. PATENT DOCUMENTS

| | | | | |
|---|---|---|---|---|
| 9,758,265 | B2* | 9/2017 | Bellante | B65B 5/08 |
| 2003/0005662 | A1* | 1/2003 | Ishii | B65B 9/073 |
| | | | | 53/54 |
| 2010/0101191 | A1* | 4/2010 | Lindee | B25J 9/0093 |
| | | | | 53/471 |
| 2010/0121489 | A1* | 5/2010 | Inazumi | G05B 19/402 |
| | | | | 700/255 |
| 2010/0170591 | A1* | 7/2010 | Murray | B65B 43/42 |
| | | | | 141/1 |
| 2011/0064553 | A1* | 3/2011 | Lanfranchi | B29C 49/4205 |
| | | | | 414/730 |
| 2013/0160399 | A1* | 6/2013 | Rosselli | B65B 35/58 |
| | | | | 53/236 |
| 2013/0302129 | A1* | 11/2013 | Smith | B25J 15/0066 |
| | | | | 414/800 |
| 2016/0107778 | A1* | 4/2016 | Last | B65B 5/06 |
| | | | | 414/331.01 |

* cited by examiner

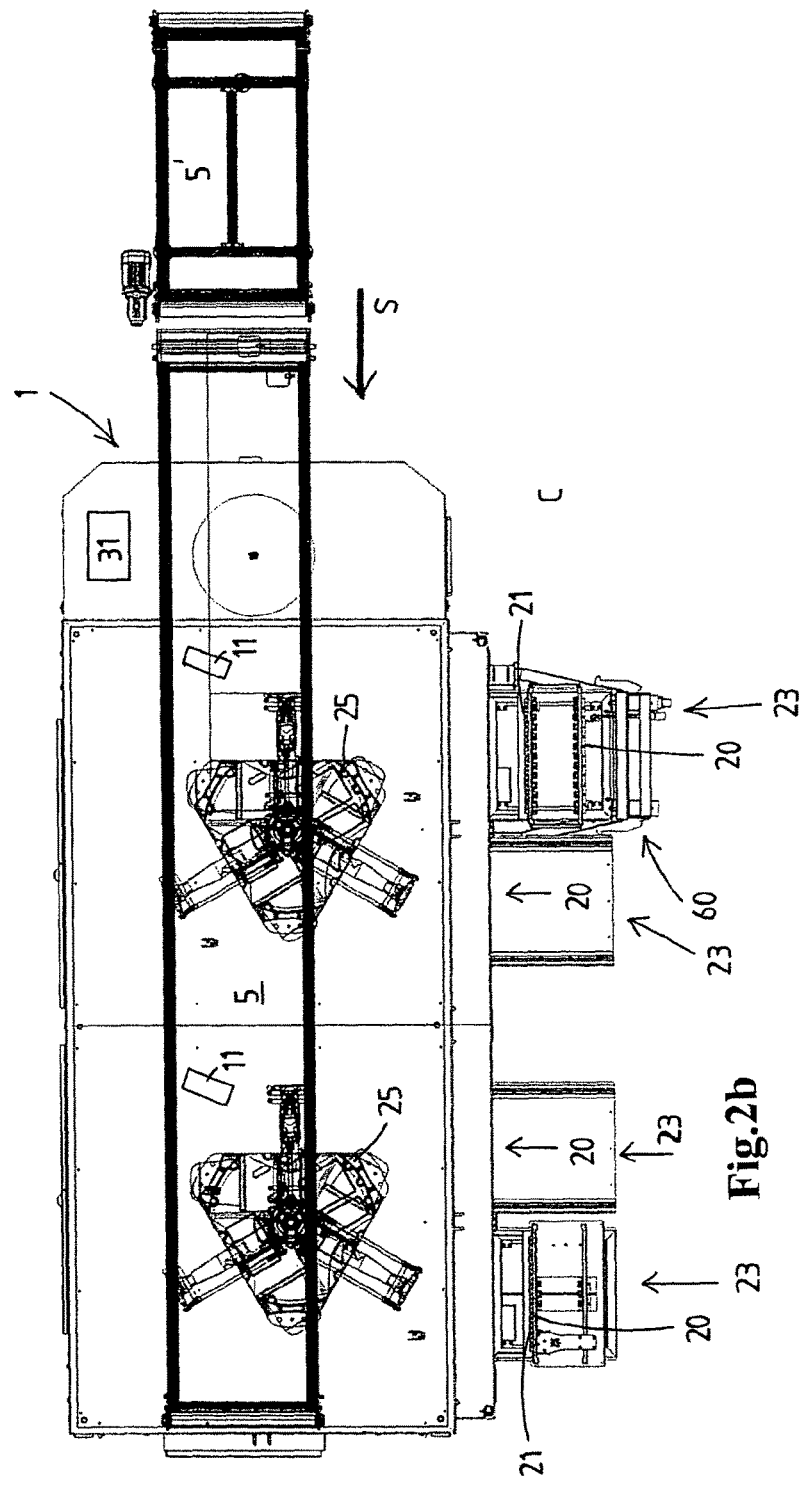

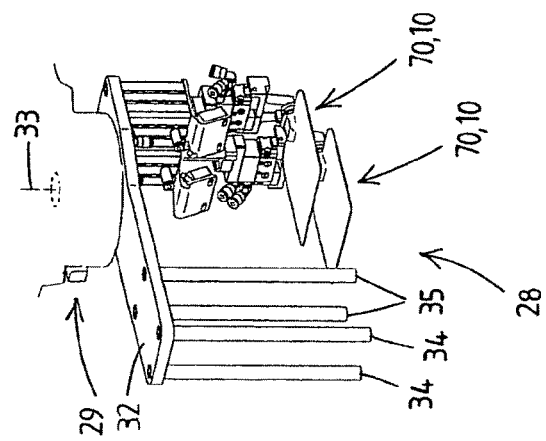
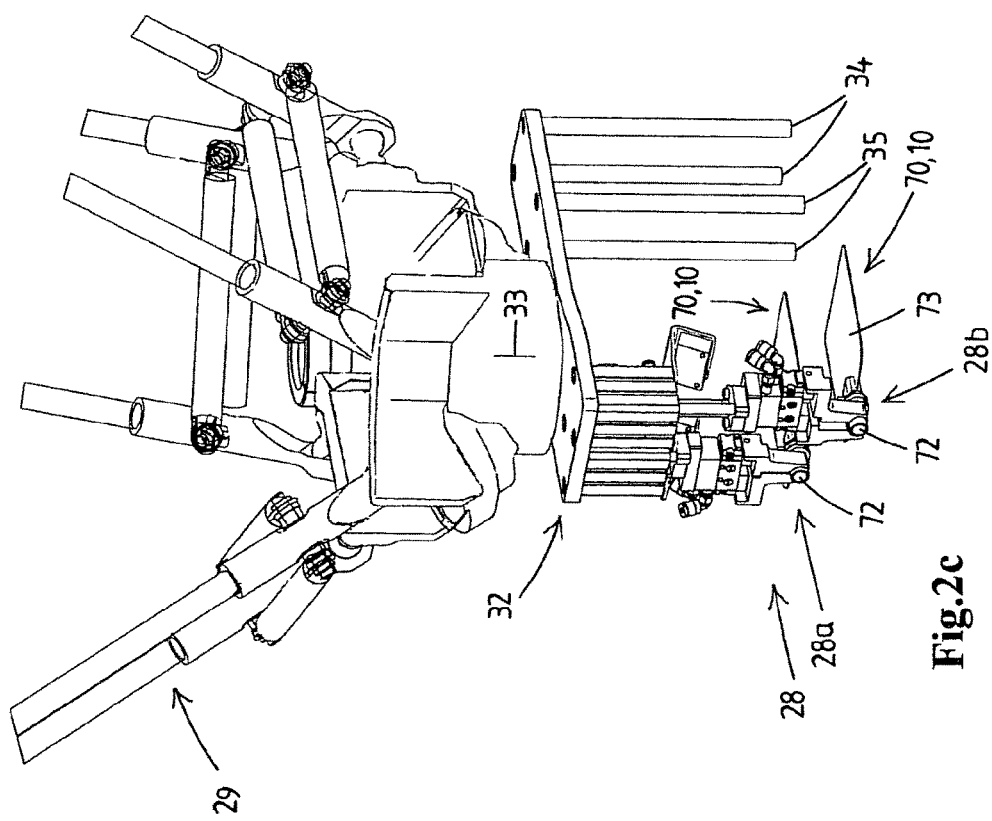

SYSTEM AND METHOD FOR THE ASSEMBLY AND COLLECTION OF NON-FILLED SPOUTED POUCHES

The present invention relates to a system and method for the assembly and collection of non-filled spouted pouches.

It is common known to, in an assembly line, assemble spouts and pouches made out of foil. Commonly, the thus obtained spouted pouches are subsequently filled with product and sealed, e.g. by a cap. A filling device is used to fill the spouted pouches, e.g. with products such as food and beverage products, chemical and personal care products, and medical and pharmaceutical products. The product may have a form that is pasty, liquid, granular or a combination thereof. Generally, automated machines for high-volume mass production of filled pouches are employed.

For several reasons, it is frequently desired to produce and assemble the spouted pouches at a location remote from the filling location. For example, when the product is produced a short time before the filling takes place, this requires a production facility suitable for producing the product, which inherently has different production facility requirements compared to a production facility for producing spouted pouches. These different production facility requirements may be difficult to match. Another reason may be the difficulty to match production capacities, in particular in terms of quantity, of these different processes.

Hence, in the field of spouted pouches, it is known to assemble and collect non-filled spouted pouches at a location remote from the filling location, and subsequently transport the non-filled spouted pouches to the filling device. The logistic costs of the spouted pouches will be part of the overall cost of the product.

The aim of the first aspect of the invention is to provide a system and a method for the assembly and collection of non-filled spouted pouches, resulting in more efficient logistics of the spouted pouches and preferably to a cost reduction of the logistics.

This aim is achieved by a system according to claim 1, and further by a method according to claim 11. With such a method and device, the spouted pouches are collected efficiently in storage rails at a collection location, and the storage rails stacked with non-filled spouted pouches are transported to the remote filling device.

According to the first aspect of the invention, the spouted pouches are discharged out of the assembly line and dropped onto a conveyor. The assembly line has one or more stations where spouts and pouches made out of foil are assembled into spouted pouches. The non-filled spouted pouches are discharged out of the assembly line. A conveyor, preferably a belt conveyor, is provided to receive the discharged non-filled spouted pouches. As the system according to the invention is able to handle non-oriented spouted pouches on the conveyor, any way of discharge by dropping is allowed. As a consequence, the method and system according to the first aspect of the invention can be used in combination with many types of existing assembly lines for spouted pouches. The conveyor onto which the spouted pouches are dropped can be any suitable conveyor having a movable surface for receiving the dropped spouted pouches, such as a transport belt conveyor, a rotating plate, etc. etc.

According to the first aspect of the invention, pouches are made out of foil. As such, a flexible pouch is made, preferably by opposing sheets of foil material, which may assume various shapes, such as a gusset pouch, cylindrical, cubical, conical, or the like. The pouch is preferably manufactured from foil sheets of laminate foil material. In an embodiment, the pouch is manufactured to include an opening for accessing or dispensing the contents therein. The opening may he formed anywhere on the pouch, such as along the side of the pouch, or in a portion of a wall of the pouch. The opening is fitted with a spout.

The spouts may e.g. be produced by injection moulding plastic material. Commonly, the spout includes a neck forming an opening and defining a longitudinal passage for accessing or dispensing the product therein, and a sealing portion to which the opening of the pouch is sealed, wherein the neck has a smaller diameter than the sealing portion. Commonly, in the assembly line the spouts are held by the neck, while the pouch is sealed to the sealing portion, e.g. by heat sealing.

Preferably, the spouts of the spouted pouches comprise engagement means to engage a storage rail, in order to collect the spouts of the spouted pouches in the storage rail. In a preferred embodiment, the spouted pouches comprise a collar structure extending radially from the outer surface of the spout, in particular the neck of the spout, the collar structure including a support surface for engaging the storage rail.

In the method and system according to the first aspect of the invention, the spouted pouches are collected in multiple storage rails, which are positioned at a collection location adjacent the conveyor. These storage rails are each embodied to hold a plurality of spouted pouches, preferably by engaging on their spouts. In an embodiment, the storage rails are each provided with a single longitudinal slot. Such a storage rail is in particular advantageous to store spouted pouches comprising a collar structure extending radially from the outer surface of the spout, in particular the neck of the spout, the collar structure including a support surface for engaging the storage rail. The spout portion with the collar is collectable in the storage rail, while the rails engage the spouted pouches by their collar, and the remainder of the spouted pouch, in particular the remainder of the spout and the pouch is allowed to extend away from the slot of the rail. In particular, the longitudinal axis of the neck of the spout extends through and perpendicular to the longitudinal slot. In a horizontally orientated rail, the pouches suspend from the rail. Alternatively, as is preferred, the rails to be filled with spouted pouches may also be oriented vertically. The vertical orientation is advantageous in view of gravity.

When placed in the rail, the pouches sealed to the spout extending away from the rail may be allowed to extend in any orientation with respect to the longitudinal slot of the rail: parallel or perpendicular or any orientation there between. The pouches of multiple spouted pouches may be in contact with each other.

In general, the dimensions of a storage rail slightly exceed that of a spout, but are much smaller than the dimensions of a pouch. Hence, the spout is allowed to fit into the storage rail, while a much larger pouch extends away from the rail. Hence, when multiple rails are provided, the pouches are allowed to overlap.

In an embodiment, the storage rail has an elongated first wall, and a pair of side walls extending from opposing sides of the first wall so as to form a generally "U" shape. The storage rail further includes a pair of inward flanges. One of the pair of flanges is disposed on one of the pair of side walls, and the other of the pair of flanges is disposed on the other of the pair of side walls. Each of the pair of flanges extends towards each other and is spaced a predetermined distance apart from the other so as to form a longitudinal slot extending along the length of the storage rail. The flanges of the storage rail are configured to engage the collar of the spout so as to hold the spouts.

Preferably, at at least one head end of the storage rail, the storage rail is provided with an open end into which the spout may be slid such that the support surface of the collar of each spout rests against a portion of each of the flanges of the storage rail.

The storage rail may be stamped out of a durable material such as steel. It should be appreciated that the length of the U-shaped storage rail will determine the number of spouted pouches that the storage rail can hold. Possibly, 40-60 spouted pouches are stacked into each rail, but also embodiments of storage rails are known storing a few hundred of spouted pouches.

The advantage of using storage rails is that storage rails enable the consistent, accurate and quick feeding of spouted pouches to a filling device. The rails preferably assure a defined orientation of the spouted pouches when introducing them into the filling device, reducing errors and facilitating efficiency in the filling processes.

The system and method according to the first aspect of the invention comprise and use a pick and place robot system provided at the collection location adjacent the conveyor. Pick and place robotic technology is commonly applied for picking tasks where speed and accuracy are crucial. Such a pick and place robot system may also be referred to as a "delta-robot". Comprising a camera system such as 2D or 3D vision systems and possibly also conveyor tracking technology, these robots are capable of picking and placing up to 100-500 items per minute. High-speed pick and place robots are generally used for fast assembly, inspection and quality control, fast packaging, and fast sortation. These robots provide a high output, while reducing operating costs and ergonomic issues. The pick and place robot system according to the first aspect of the invention is operable to stack and collect the spouted pouches efficiently into the multiple storage rails at the collection location.

According to the first aspect of the invention, the pick and place robot system comprises a camera system operable to perform visual observations on the conveyor, identifying the spouted pouches that have been dropped onto the conveyor. The pick and place robot system further comprises a gripping device adapted to pick up one or more spouted pouches, preferable necks of the spouted pouches, and to place each of the spouted pouches into at least one of the multiple storage rails, and a robot arm connected to the gripping device adapted to transport the gripping device. The robot system further comprises a controller adapted to control the gripping device and robot arm on the basis of a stacking program and the observations from the camera system.

As a result, the gripping device and robot arm connected to the gripping device are controlled to move to the conveyor, where the gripping device is operable to pick up in a picking action one or more spouted pouches from the conveyor, based on the observations from the camera system. The robot arm with gripping device and one or more spouted pouches are subsequently allowed to be transported from the conveyor to one of the multiple storage rail, based on a stacking program, where the gripping device is operated to place the one or more spouted pouches into the storage rail. Thus, the position of the spouted pouches is checked by the camera system, and this position is forwarded to the robot arm and gripper to be able to pick up the spouted pouch. The gripping device of a pick and place robot system allows picking up the spouted pouch from a non-oriented position on the conveyor.

In a possible embodiment, the pick and place robot system comprises at least two independently operating robot arms, each with a gripping device, wherein preferably the pick and place robot system comprises load balancing software to divide the spouted pouches on the conveyor between the robot arms.

Possibly, the gripping device is a dual head gripper having two grippers, each one adapted to pick up a spouted pouch from the conveyor. Hence, the two grippers can each pick up a spouted pouch. The picking up preferably takes place consecutively, and the dual head gripper preferably allows the picking up of two spouted pouches have a different orientation. Preferably, the grippers are arranged in the dual head gripper such that the dual head gripper is suitable to place the two spouted pouches into two storage rails, which are preferably arranged parallel and side by side. Hence, preferably the spacing between the grippers corresponds to the spacing between the storage rails. As indicated before, due to the large dimensions of the pouches, the pouches are allowed to overlap when the spouted pouches are filled into multiple storage rails, in particular storage rails arranged side-by-side. Such a dual head gripper preferably has a capacity to pick up about 80 pouches per minute, preferably up to 100 pouches per minute. In a pick and place robot system comprising multiple robot arms, preferably each robot arm is provided with a gripping device embodied as a dual head gripper.

As indicated previously, a spout commonly includes a neck forming an opening and defining a longitudinal passage for accessing or dispensing the product therein, and a sealing portion to which the opening of the pouch is sealed. Preferably, the gripping device grips the neck of the spout.

In a preferred embodiment of the method and system according to the first aspect of the invention, a packaging device is provided at a packaging position, which is adapted to pack the storage rails with the stacked spouted pouches into a transportation package, such as a bag or box, e.g. made of plastic or cardboard. Further, a manipulator is provided, which is adapted to transport the multiple storage rails with the stacked spouted pouches from the collection location to the packaging position. Hence, the system according to the invention collects the spouted pouches into storage rails, which are suitable for transportation as such, but it is also conceivable that the multiple storage rails with spouted pouches are subsequently packed in a transportation package by the packaging device. The transportation package may be a bag or a box, or a combination thereof. As explained later, according to the second aspect of the invention, the spouted pouches are packed subsequently into a primary package, a secondary package and a transport box, which packaging method is in particular advantageous when the spouted pouches are made and to be filled in a cleanroom.

Preferably, at the collection location, the storage rails are positioned vertically and side by side, having an open top end and a vertical slot, allowing the pouches to extend essentially horizontally and perpendicular to the rail. A vertical orientation allows a vertical stacking, wherein the spouts are positioned in the open top end of the rail, and possibly pushed slightly into the rail, and wherein gravity aids to fill the entire rail by allowing the spouts to fall or slide downwards in the rail.

Preferably, at the collection location, a retainer is provided adapted to retain at least one row of storage rails side by side, wherein the storage rails are provided with longitudinal slots, which storage rails are retained with their slots parallel and vertically orientated and all facing the same direction in one row. Preferably, the storage rails are further provided with an open end at one of the head ends of the rail, which open ends are provided at the top side of the retainer. The vertical orientation is advantageous in view of gravity. The provision of a retainer to retain multiple rails is advantageous to transport the rails with pouches efficiently. Preferably, a retainer retains between 10-20 storage rails, arranged side by side. Possibly, the rails are arranged manually in the retainer by an operator. Alternatively, this is done automatically.

Possibly, a system according to the first aspect of the invention is provided with multiple retainers positioned simultaneously at the collection location adjacent the conveyor. Preferably at least one, preferably two, retainers are provided per robot arm.

In an embodiment, the retainer is embodied as a storage cassette, comprising two opposite rows of storage rails, wherein the slots of one row are substantially opposite the slots of the opposite row. Consequently, in such a storage cassette 20-40 rails are provided, each capable of storing 40-60 spouted pouches. Hence, a storage cassette is allowed to store 800-2400 spouted pouches. It is noted that in practice, filling devices are available with filling capacities in the order of 1000-6000 spouted pouches per hour.

Possibly, a system according to the first aspect of the invention is provided with multiple storage cassettes positioned simultaneously at the collection location adjacent the conveyor. Consequently, it is possible with the system according to the first aspect of the present invention to fill multiple cassettes at the same time.

Possibly, the system further comprises multiple docking stations at the collection location, each one being provided to store a retainer, such as a cassette, and a trolley adapted to remove the retainer from the docking station, and adapted to transport a retainer with the stacked spouted pouches away from the docking station, preferably to a packaging position (P). Possibly, a docking system is provided to "dock" the retainer in the right position, e.g. a push/pull lever, operable by an operator. The combination of docking station and trolley allows, after removal of a retainer stacked with spouted pouches, an empty retainer to enter the docking station a.s.a.p, enabling an efficient collection process.

Possibly, the system according to the first aspect of the invention is provided with an unloading device adapted to remove the multiple storage rails with the stacked spouted pouches from the retainer, to form an assembly of stacked spouted pouches and multiple storage rails. Preferably, unloading occurs by lifting the storage rails up out of the retainer. Such an assembly can advantageously be handled further by the manipulator moving the multiple storage rails with the stacked spouted pouches to the packaging position. The unloading of a retainer, embodied as a storage cassette is for example possible when the storage cassette comprises an upper and a lower cassette part, and wherein the upper cassette part is removable from the lower cassette part, e.g. manually, while the lower cassette part maintains the support of the multiple storage rails. In this case, the manipulator arm is advantageously capable of handling all spouted pouches provided in the cassette, which may be 800-2400 spouted pouches.

The provision of retainers, docking stations for retainers, trolleys and an unloading device allows for a method for the assembly and collection of non-filled spouted pouches, wherein a first empty retainer is provided at the docking station, where it is filled with spouted pouches. Once it is filled, the first retainer is removed from the docking station by the trolley and positioned adjacent the unloading device.

A second empty retainer is provided to the docking station immediately after removal of the first retainer, allowing a continuous operation of the pick and place robot system. The first retainer is subsequently unloaded, forming an assembly of stacked spouted pouches and multiple storage rails which can be handled further by the manipulator to the packaging position.

Advantageously, the unloading device is operable to move the multiple storage rails closer together, to obtain a compact assembly of stacked spouted pouches and multiple storage rails, resulting in even more efficient logistics. For example, the rails are pressed towards each other.

As indicated previously, after filling the spouted pouches the pouches are sealed, e.g. by a sealing cap. It is conceivable that the spouted pouches are provided with caps before they are transported to the filling device, where the caps are removed during the filling process. Alternatively, it is also common to transport sealing caps to the filling device, independent of the spouted pouches.

The first aspect of the present invention also relates to a method for the assembly and collection of non-filled spouted pouches, the method comprising the following steps:
assembling spouts and pouches made out of foil into spouted pouches in an assembly line,
discharging the spouted pouches out of the assembly line and dropping them onto a conveyor,
operating a camera system of a pick and place robot system provided adjacent the conveyor to perform visual observations on the conveyor, identifying the spouted pouches,
on the basis of a stacking program and the observations from the camera system, operating a controller to control a gripping device and robot arm connected to the gripping device to:
pick up one or more spouted pouches;
transport the spouted pouches from the conveyor to at least one of multiple storage rails in which the spouted pouches are collectable;
place the one or more spouted pouches into at least one of the multiple storage rails.

In a possible embodiment, the above method is followed by moving the multiple storage rails with the stacked spouted pouches by a manipulator to a packaging position with a packer device, wherein at the packaging position a packer device packs up the multiple storage rails with the stacked spouted pouches in a package, such as a bag or box, e.g. made of plastic or cardboard.

Advantageously, prior to the movement to the packaging position, an unloading device removes the multiple storage rails with the stacked spouted pouches from a storage cassette. Possibly, the unloading device moves the multiple storage rails closer together, to obtain a compact package of spouted pouches and storage rails.

Possibly, the method is carried out in a cleanroom.
Possibly, the method is followed by:
transporting the multiple storage rails with the stacked spouted pouches to a remote filling device,
removing the spouted pouches from the storage rails,
filling the spouted pouches.
Optionally, these steps are followed by mounting a cap onto the spout, which may be a tamper-evident cap. Yet alternatively, a separate step enables the provision of a tamper-evident seal around the cap.

As indicated above, in the field of spouted pouches, it is common to assemble and collect non-filled spouted pouches at a location remote from the filling device, and subsequently transport the non-filled spouted pouches to the filling device. When filling takes place in a cleanroom, spouted pouches are required that are also made in a cleanroom. This demands an improved logistic process of packaging and transporting collected spouted pouches.

Accordingly, a second aspect of the present invention relates to a method of transporting pouches made in a production cleanroom to a remote cleanroom comprising a filling device, which pouches are transported between the cleanrooms in a non-cleanroom.

The aim of the second aspect of the invention is to provide an improved method of transporting pouches, resulting in efficient logistics of the pouches made in a production cleanroom to a remote cleanroom comprising a filling device.

This aim is achieved by a method of transporting pouches made in a production cleanroom to a remote cleanroom comprising a filling device, which pouches are transported between the cleanrooms in a non-cleanroom according to claim 18, the method comprising the following steps:

collecting the non-filled pouches in the production cleanroom at a cleanroom packaging position with a first packaging device, at the cleanroom packaging position, the first packaging device packing the collected pouches in a primary package, e.g. formed by a plastic bag, which is suitable to be unpacked in a cleanroom, at the cleanroom packaging position, the first packaging device packing the primary package in a secondary package, e.g. formed by a plastic bag, which is suitable to be stored in a transport box adapted to be transported between the cleanrooms, e.g. a cardboard box, which transport box is not suitable to enter a cleanroom, moving the secondary package, comprising the primary package and the collected pouches, out of the production cleanroom to a non-cleanroom packaging position with a second packaging device, at the non-cleanroom packaging position, the second packaging device packing the secondary package, comprising the primary package and the collected pouches, into the transport box, transporting the transport box to, but not into, the remote cleanroom comprising the filling device, outside the remote cleanroom, removing the transport box and the secondary package from the primary package in which the pouches are collected, moving the primary package with the pouches into the filling cleanroom comprising the filling device, removing the primary package from the pouches, filling the pouches.

With such a method according to the second aspect of the invention the pouches are transported efficiently in a primary and secondary package and in a transport box from the production cleanroom to a remote cleanroom comprising a filling device, according to which method the pouches can be unpacked guaranteeing the cleanroom to stay clean, i.e. without a package contaminating the cleanroom environment.

Preferably, the primary and secondary package are formed by plastic bags, which are suitable to enter a cleanroom. In the production cleanroom, both the primary and secondary package are allowed to enter the cleanroom, to pack the pouches. Commonly applied cardboard transport boxes are not allowed in a cleanroom, and suitable as a transport box. As packages that have been in contact with such a transport box that is not suitable to enter a cleanroom are also not allowed to enter a cleanroom, the method foresees in a primary and a secondary package. As a result, before entering the remote cleanroom comprising the filling device, both the transport box and the package that has been in contact with the transport box can be removed.

The above-described method according to the second aspect of the invention is suitable for any type of pouches, not necessarily spouted pouches. In a possible embodiment, the step of collecting the non-filled pouches in the production cleanroom at a cleanroom packaging position with a first packaging device is carried out by:

stacking the spouted pouches into storage rails to form an assembly of stacked spouted pouches and multiple storage rails, moving the assembly of stacked spouted pouches and multiple storage rails to the cleanroom packaging position;

and wherein after removal of the primary package from the pouches, the spouted pouches are allowed to be removed from the storage rail.

In a possible embodiment of the second aspect of the invention, in the production cleanroom spouts are assembled to the pouches, and the spouted pouches are collected using a system for the assembly and collection of non-filled spouted pouches according to the first aspect of the invention.

The invention will be described in more detail in relation to the drawings, in which:

FIG. 2b shows a top view of the part of the system of FIG. 2a;

FIG. 2c shows a gripper of the system of FIG. 2a holding two spouted pouches;

FIG. 2d shows the gripper of FIG. 2c from another angle;

Figure 6:
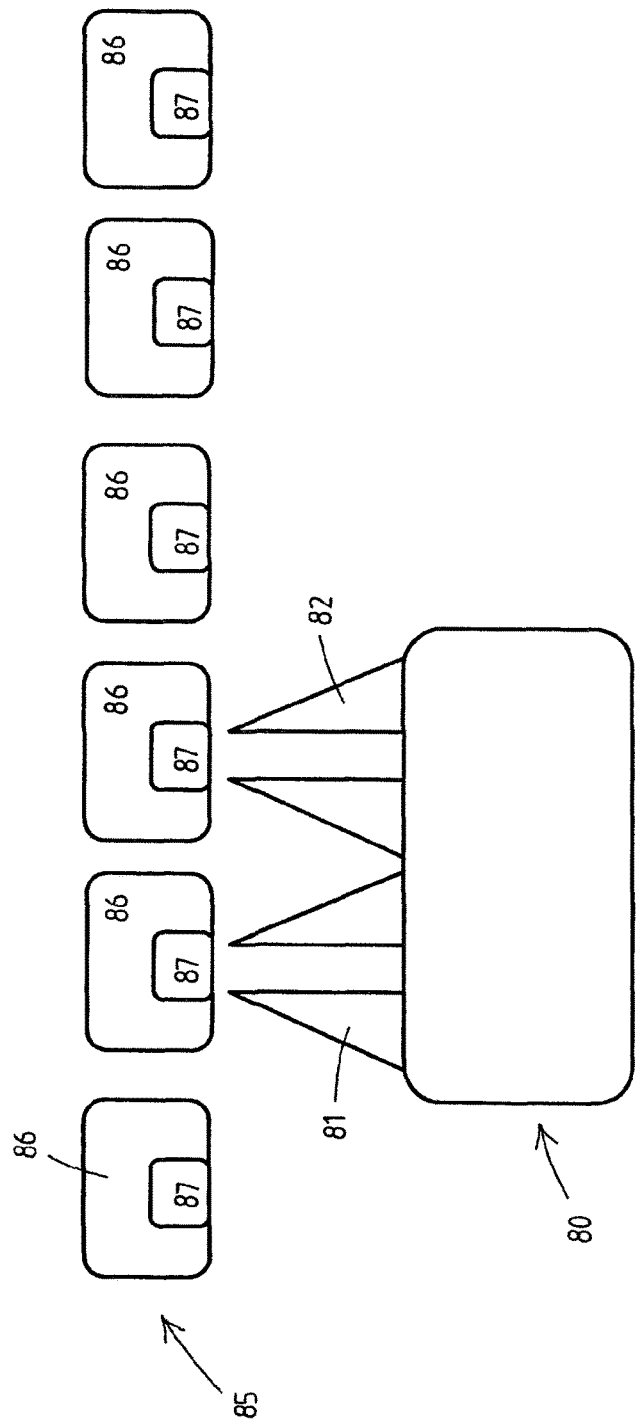
Figure 7:
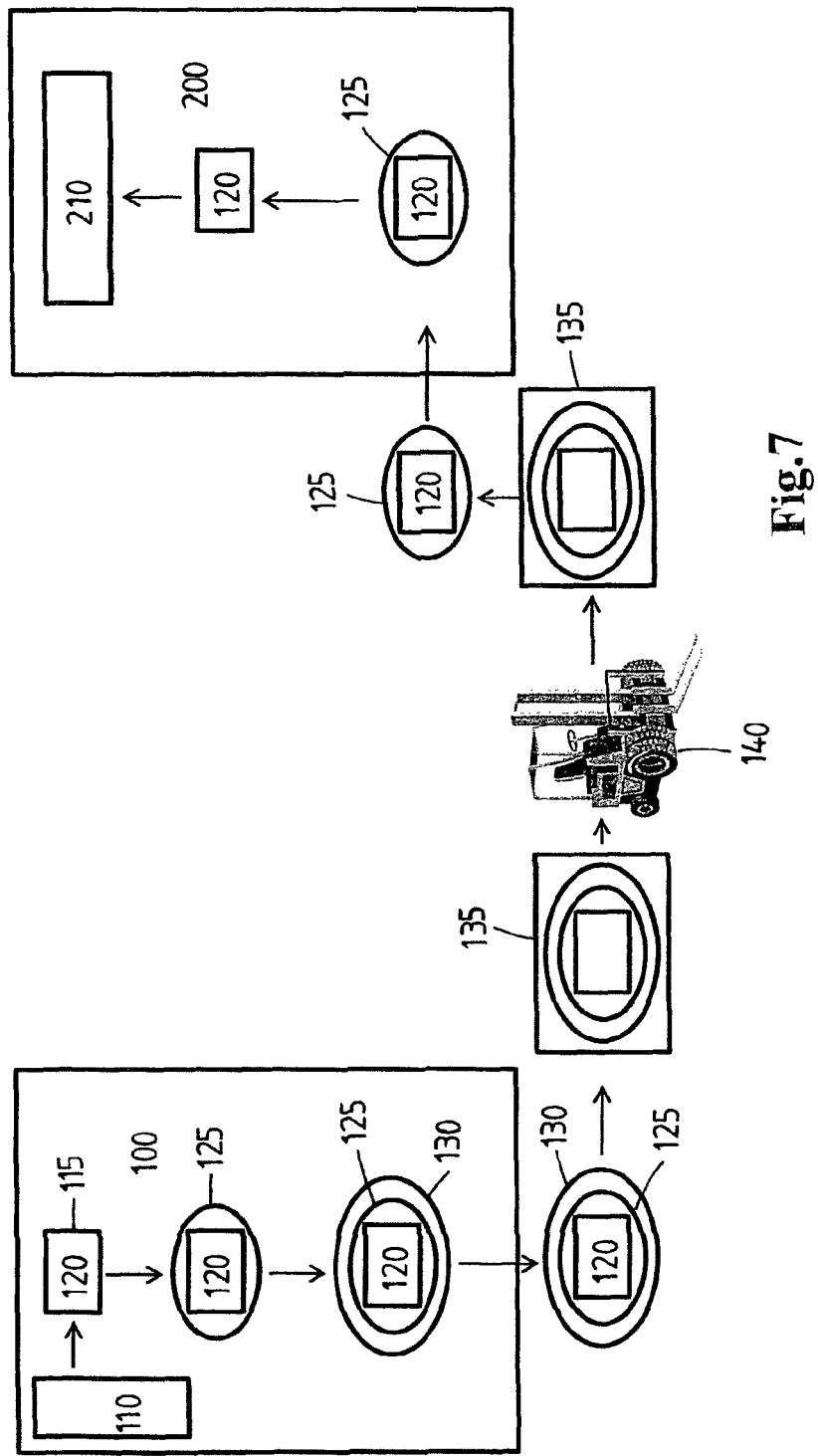

FIG. 6 schematically shows a dual head gripper according to a preferred embodiment of the invention;

FIG. 7 schematically shows the method according to the second aspect of the invention.

Figure 1:
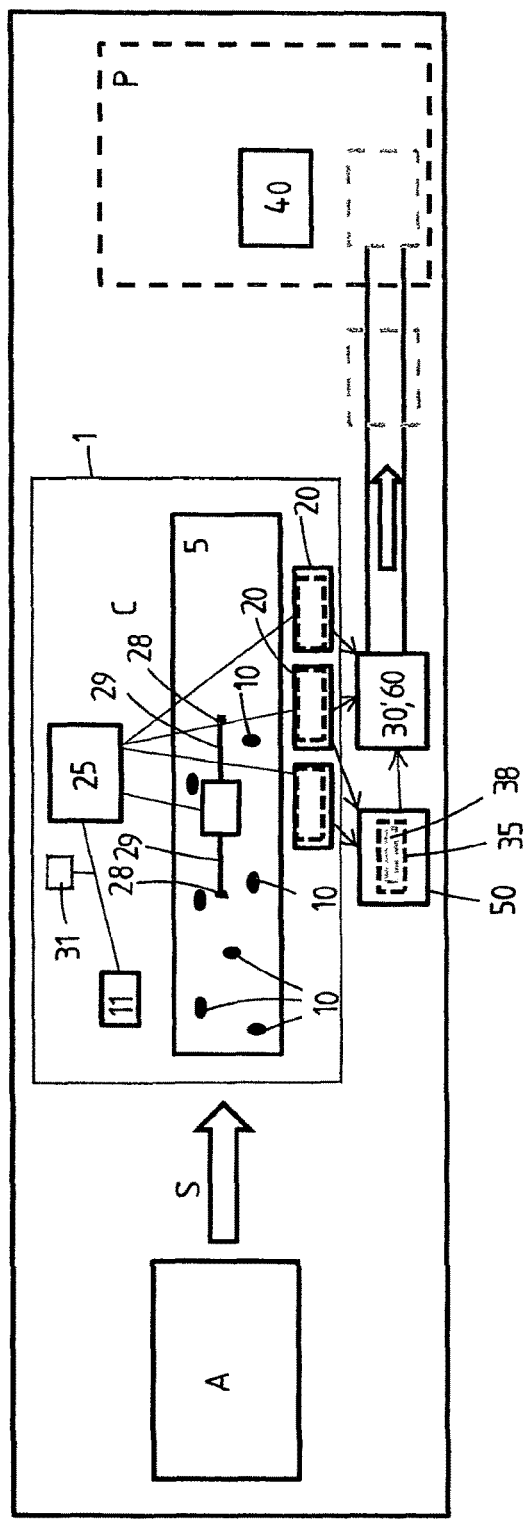
FIG. 1 shows a highly schematical top view of a system according to the first aspect of the invention.
Figure 2A:
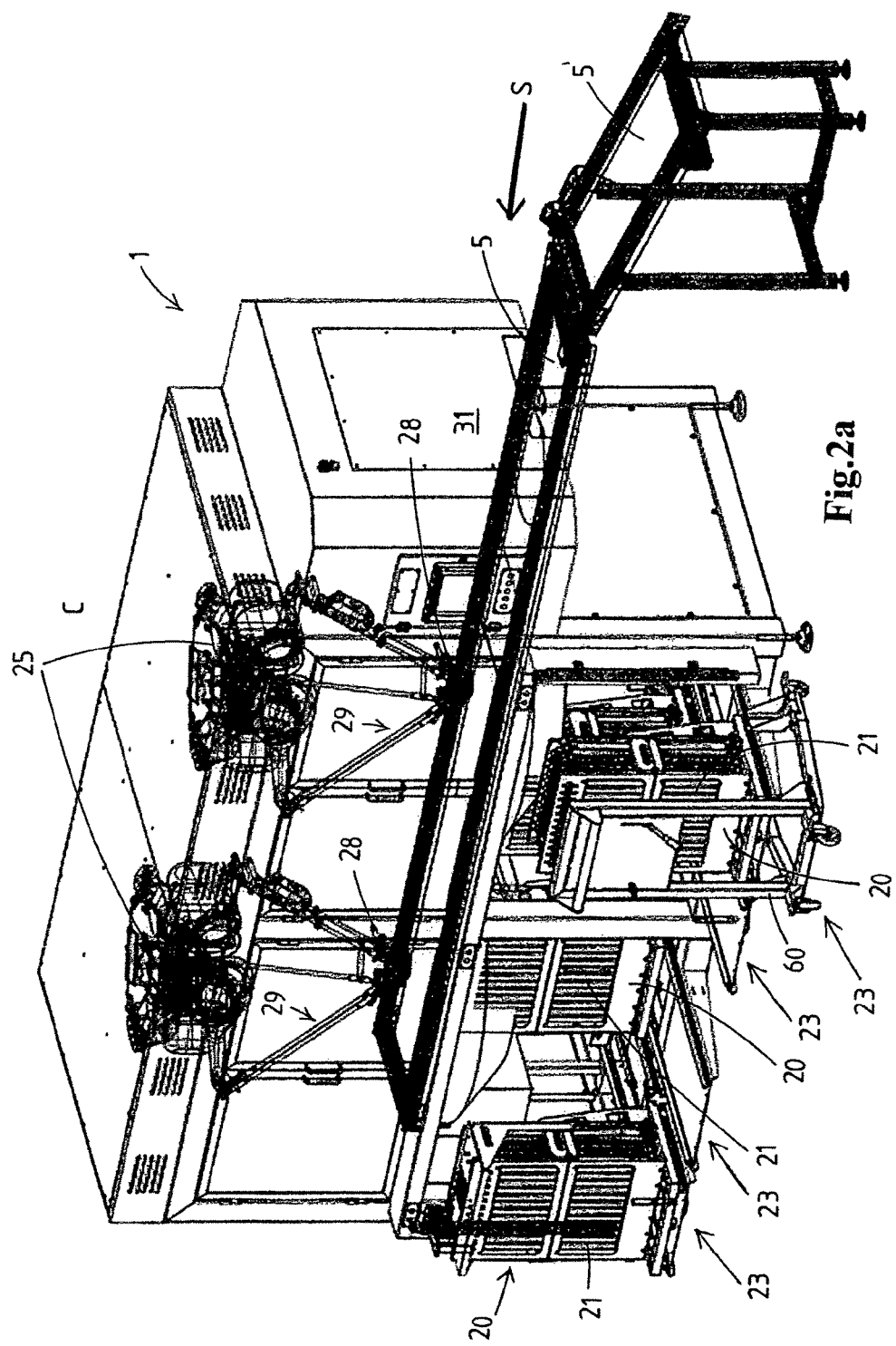
FIG. 2a shows a perspective view of part of a system according to the first aspect of the invention.

FIGS. 1 and 2a, 2b both show a system for the assembly and collection of non-filled spouted pouches according to the first aspect of the invention. Similar parts are indicated with same numerals.

The FIGS. 1, 2a, 2b, 2c, 2d show a system for the assembly and collection of non-filled spouted pouches 10 to be transported to a remote filling device (not shown).

Optionally, the system is positioned in a conditioned environment, such as a cleanroom.

The system, shown schematically in its entirety in FIG. 1, comprises an assembly line A wherein spouts and pouches made out of foil are assembled into non-filled spouted pouches 10. The spouted pouches 10 are discharged out of the assembly line A and dropped onto a conveyor 5, preferably a belt conveyor with one or more conveyor belts, which is visible in both FIG. 1 and FIGS. 2a, 2b.

Dropping implies that the non-filled spouted pouches leaving the assembly line A are allowed to fall onto the conveyor belt, and will or may thus lay on the conveyor belt or other conveyor surface in a non-oriented position.

The direction of supply to the conveyor is indicated with arrows S; hence, from right to left the FIGS. 2a, b. In FIGS.

2a, 2b, a conveyor portion 5' is visible at the entry side of a collection installation for non-filled spouted pouches, which connects to a further belt 5 conveyor within the collection installation. At a downstream end of the belt 5 it can be envisaged that pouches that are not handled by the collection installation are discharged, e.g. into a bin. It is envisaged that non-collected pouches can be returned into the supply S of the conveyor 5.

The system further comprises multiple slotted storage rails 21, that are—in view of the collection of non-filled spouted pouches—releasably arranged in a storage cassette 20 which is adapted to retain multiple storage rails 21.

One or more cassettes 20, each with multiple rails 21, are removably positioned at a collection location C adjacent the conveyor 5, here within a pouch collection robot device of the installation. As is preferred two cassettes 20 are stationed in the device 1 per robot, allowing continuous operation of the robot.

The device 1 is provided with multiple docking stations 23, three of which are clearly visible in FIG. 1, at the collection location C, each one being adapted for docketing therein a cassette 20 filled with rails 21.

In FIGS. 2a, 2b a trolley 60 is illustrated which is provided adapted for transportation of a cassette 20 with rails 21 and to dock the cassette into a docking station 23 as well as remove a filled cassette from the docking station. Any other type of manipulator 30 (schematically indicated in FIG. 1) may also be provided adapted to remove the rails 21, with or without a cassette retaining multiple rails, from the collection location C.

Preferably, the manipulator 30/trolley 60 is capable of moving a group of multiple storage rails 21 with the stacked non-filled spouted pouches, e.g. retained in a cassette 20, to a packaging position P.

At the packaging position P, preferably a packaging device 40 is provided which is adapted to pack the rails 21 with the stacked spouted pouches therein into a transportation package, such as a bag or box, e.g. made of plastic or cardboard.

The storage rails 21 and storage cassette 20 will be explained later in more detail in relation to FIGS. 3-5.

FIG. 1 and FIGS. 2a,2b,2c,2d illustrate pick and place robot 25, provided at the collection location C, preferably as part of a pouch collection robot device 1.

In FIGS. 2a, b it is shown that the device 1 has two robots 25.

The pick and place robot 25 according to the first aspect of the invention comprises:
  a camera system 11 operable to perform visual observations on the conveyor 5, identifying and localizing the non-filled spouted pouches 10 lying on the belt 5,
  a gripping device 28 adapted to pick up one or more non-filled spouted pouches 10 from the belt 5, retain the pouch, and to place the pouch 10 into one of the storage rails 21,
  a robot arm 29 holding the gripping device 28 and adapted to transport the one or more gripper spouted pouches 10 from the conveyor 5 to one or more storage rails 21,
  a computerized controller 31 adapted to control the gripping device 28 and the robot arm 29 on the basis of a stacking program run on the controller and based on the observations from the camera system.

The robots 25 of the device 1 in FIGS. 2a, 2b have independently movable robot arms 29, each with a gripping device 28.

Preferably the robot 25 is embodied as a delta-robot, with an arm 29 composed of multiple rods, as is visible in FIGS. 2a, 2b, 2c.

Preferably, the gripping device 28 of each robot 25 is a dual head gripper (schematically shown in FIG. 6) comprising two grippers, each one adapted to pick up a spouted pouch from the conveyor, which grippers are oriented in the dual head gripper such that the gripping device is suitable to place the two spouted pouches into two adjacent storage rails.

In FIG. 1, schematically an unloading device 50 is shown. The unloading device 50 may be operable to remove multiple storage rails with the stacked spouted pouches from the storage cassette 20, to form an assembly 35 of stacked spouted pouches and multiple storage rails. Optionally, the unloading device 50 is operable to move the multiple storage rails closer together, to obtain a compact assembly 38 of stacked spouted pouches and multiple storage rails.

Such an assembly 35 or a compact assembly 38 of stacked spouted pouches and multiple storage rails can be moved to the packaging position P by manipulator 30.

Figure 4:
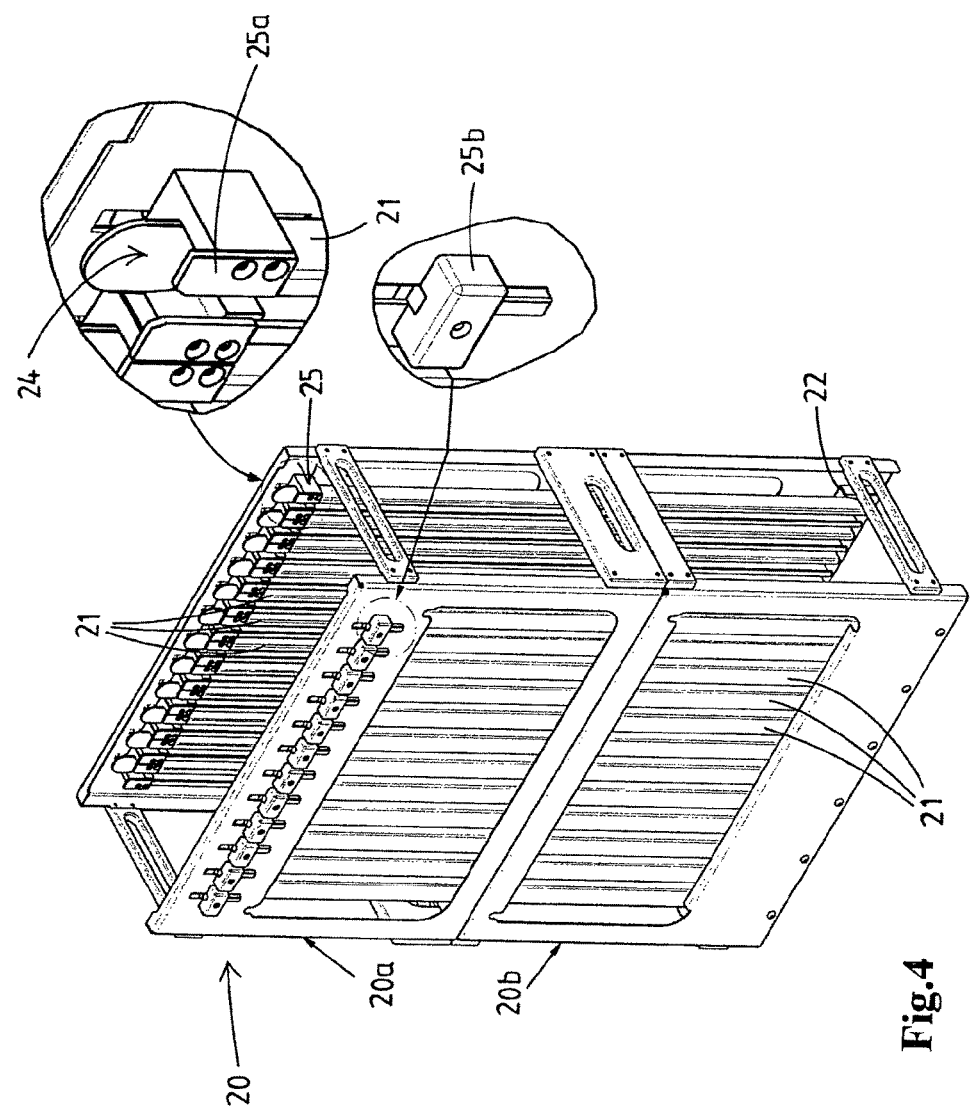
FIG. 4 shows the cassette of FIG. 3 in more detail in a perspective view.

In FIG. 4, a storage cassette 20 is shown in detail.

In each cassette 20, two opposed rows of multiple storage rails 21 in side-by-side parallel orientation are releasably retained. The slots in the rails 21 of the opposed rows are directed towards the space between the opposed rows of rails 21. The distance between the opposed rows of rails 21 is such that a pouch 10 of which the spout is introduced into a rail does not become folded by contacting the opposite row of rails, e.g. the distance between the opposed rows being slight greater than the length of a pouch foil body of the pouch.

As is shown, the rails 21 are retained in vertical orientation in a cassette 20, at least when the cassette is held in a docket station 23 for collection of non-filled spouted pouches 10 into the rails 21. This allows for efficient operation of the robot 25 as the gripper of the robot 25 can release the pouch 10 as soon as the spout thereof is introduced into the top portion of a rails 21.

In the shown embodiment, the cassette 20 comprises an upper cassette part 20a and a lower cassette part 20b, wherein the upper cassette part 20a can be removed from the lower cassette part 20b while the lower cassette part 20b maintains the support or retention of the multiple storage rails 21.

The lower part of the cassette 20 comprises multiple lower rail connectors 22, adapted to releasably retain the lower part of the storage rails 21. The upper part of the cassette 20a comprises multiple upper rail connectors 25a, 25b, adapted to releasably retain the upper parts of the storage rails 21.

In the rows of storage rails 21 held by connectors 22, 25 the slots of the slotted rails 21 are parallel and vertically orientated. All slots face the center space between the opposed rows of rails 21.

In the cassette 20, the slots of the opposed rows of rails 21 face each other. The rails 21 have an open top end 24 into which a spout of a spouted pouch is insertable by means of the gripper 28 of the robot 25.

The open ends 24 of the rails 21 are positioned at the upper parts of the storage rails 21, at the top side of the cassette 20 near the upper rail connector 25. This is shown in detail in the inserts of FIG. 4, wherein the open end 24 is visible, and upper rail connector 25 comprising an inlet for the spouted pouches. The upper retaining portion comprises a rail engaging portion 25a, provided at the inner side of the cassette, and a cassette engaging portion 25b, engaging the cassette 20. The rail engaging portion 25a and the cassette engaging portion form the connection between the rails 21 and the cassette 20.

As visible in FIGS. 1 and 2, the device 1 is provided with multiple docking stations 23 for cassettes at the collection location C, each one being provided to store a cassette 20.

A trolley 60 is provided and is adapted to remove a full cassette 20 from the docking station 23, such that a cassette 20 loaded with spouted pouches can be removed easily from the docking station 23, and the docking stations can be provided with cassettes holding empty rails 21 efficiently.

Figure 3:
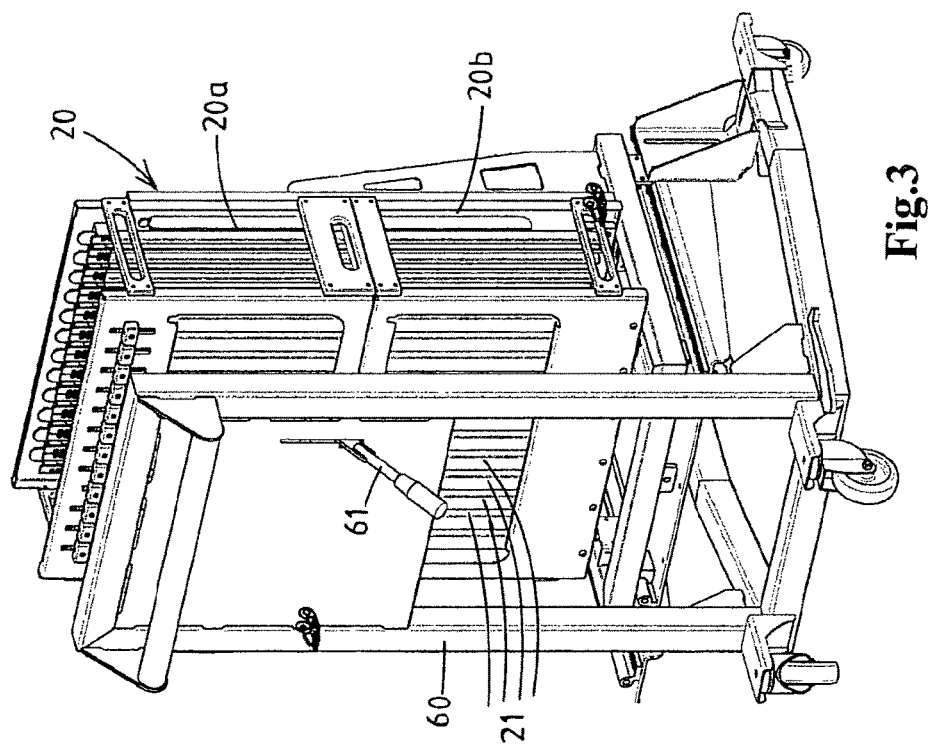
FIG. 3 shows the trolley with a cassette of FIGS. 2a, 2b in a perspective view in more detail.

An example of a trolley 60 is shown in detail in FIG. 3. A push/pull lever 61 is visible, which is used to 'dock' the cassette 20 in the right position in the device 1.

Possibly, as here, the trolley 60 allows to convey a cassette 20 with rails 21 that have been filled with spouted pouches to an unloading device, as indicated in FIG. 1, which is operable to engage on and to remove, as a unit, the multiple storage rails 21 from the cassette 20, in order to form an assembly 35 of stacked spouted pouches still retained by the two rows of multiple rails 21.

Optionally, the unloading device 50 is operable to move the multiple rails 21 with the stacked spouted pouches closer together, e.g. within each row to reduce the spacing between adjacent rails and/or the distance between the opposed rows of rails 21, in order to obtain a further compacted assembly 38 of stacked spouted pouches and the rails 21. Such an assembly 35 or a compacted assembly 38 of stacked spouted pouches and multiple storage rails 21 can be conveyed to the packaging position P by a further manipulator 30.

Figure 5:
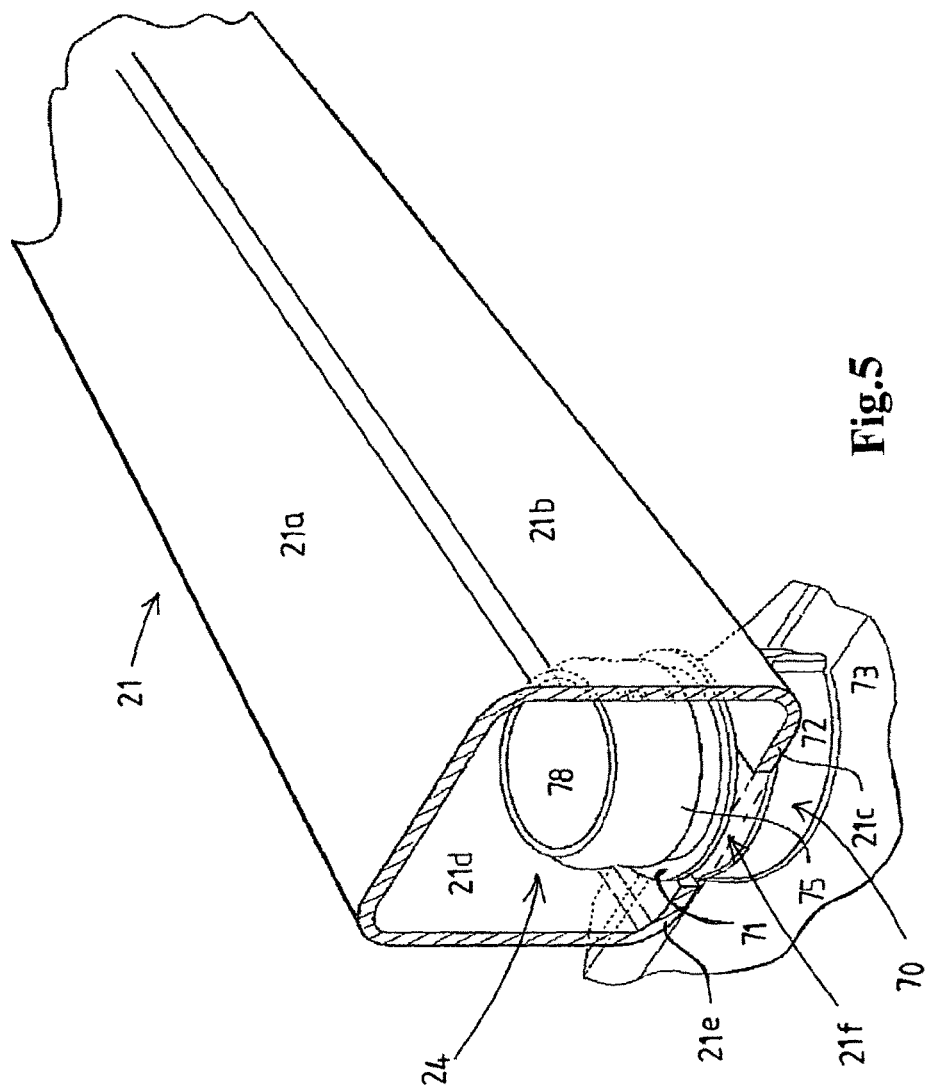
FIG. 5 shows an embodiment of a storage rail and part of a spouted pouch in a perspective view.

In FIG. 5, an embodiment of a storage rail 21 is shown in detail. Each rail has a slot and is adapted to engage a spout, e.g. between two spaced apart flanges that extend around a neck of the spout.

In this embodiment, the storage rail 21 is provided with a longitudinal slot 21f, and the spouted pouches 70 are provided with a spout having a collar 71. The storage rail 21 has an elongated first wall 21a, and a pair of side walls 21b, 21d extending from opposing sides of the first wall so as to form a generally "U" shape. The storage rail 21 further includes a pair of flanges 21c, 21e. One flange 21c of the pair of flanges is disposed on side wall 21b, and the other flange 21e is disposed on the other side wall 21d. Each of the pair of flanges 21c, 21e extends towards each other and is spaced a predetermined distance apart from the other so as to form a longitudinal slot 21f extending along the length of the storage rail 21.

Spouted pouch 70 is only partly shown, and also only schematically in FIG. 5. Only a small part of pouch foil body 73 is visible here, which is sealed to the sealing area of the spout 72. The spout further comprises a neck 75, here having a smaller diameter than the sealing area 73, and comprising a passage 78 for filling the pouch 70 and for dispensing the content from the pouch 70. On the neck 75, the spout is provided with a flange, group of flanges, or collar 71 extending radially from the outer surface of the neck of the spout. The neck may further include screw thread (not shown) for a cap. Possibly a cap is already present on the spout, e.g. a removable and replaceable cap secured to the spout, e.g. a screw cap.

The collar 71 of the spout is adapted to engage on the rail 21, here by the flanges of the rail opposite the slot sliding between the flanges on the neck 75.

In FIGS. 2 and 6 a dual head gripper 28 adjacent a row 85 of storage rails 21 is schematically shown, e.g. the row 85 being retained releasably along a side of the frame of a cassette 20 not shown here.

The shown portion of the row of storage rails 21 comprises six storage rails 21, each of which is provided with a longitudinal slot 21f. The slots 21f are parallel and vertically orientated and all face the same direction in the row 85.

Each dual head gripper 28 has a common carrier 32 with two independently actuated grippers 28a, 28b, each one adapted to pick up one single spouted pouch 10 from the conveyor belt 5.

As is preferred each gripper 28a, 28b has two gripper fingers that can be actuated to grip a spout there between.

The grippers 28a, 28b are operated to pick up two spouted pouches 10 consecutively, hence, gripper 28a may pick up a spouted pouch 10 from the belt 5, after which the gripper 28b is allowed to move to another spouted pouch where gripper 28b picks up a second spouted pouch 10.

According to a preferred embodiment of the first aspect of the invention, the grippers 28a, 28b are arranged in the dual head gripper 28 such that the gripper 28 is suitable to place the two spouted pouches 10 substantially simultaneous into two adjacent storage rails 21, which are preferably arranged parallel and side by side.

Hence, the distance between the grippers 28a, 28b preferably corresponds to the distance between adjacent rails 21 in a row 85, e.g. when held in cassette 20.

Preferably each gripper 28a, 28b is vertically mobile, e.g. by a pneumatic actuator, relative to carrier 32.

As is preferred the carrier 32 allows for rotation thereof about a vertical axis 33. This allows to rapidly align the grippers 28a, b with one of the opposed rows of rails 21 held by cassette 20.

As is preferred the carrier 32 is provided with one or more pusher rods 34, which are arranged to push one or more spouted pouches further down along the rails 21 during the placement of a newly collected pouches, or pouches, in one or more rails.

As is shown here, the pusher rods 34 are arranged to engage on the spouts of pouches already collected in rails in the row opposite from the row of rails into which the gripper 28 places one or more spouted pouches. So the distance between the gripper fingers of grippers 28a, 28b and the pusher rods 34 generally corresponds to the distance between the centers of opposed rails 21.

The gripper head 28 may also be provided with one or more pusher rods 35 that engage on pouch bodies 73 of already collected spouted pouches 70.

As is visible the storage rails 21 are held in cassette 20 close to each other, as a result of which the pouch bodies 73 overlap when they are collected by the storage rails 21. Accordingly, the pouch bodies 73 of the spouted pouches also overlap in the dual head gripper 28, as the grippers 28a, 28b are provided at the same close distance to each other.

FIG. 7 schematically shows the method according to the second aspect of the invention. The method according to the second aspect of the invention is related to transporting pouches made in a production cleanroom 100 to a remote cleanroom 200 comprising a filling device 210, which pouches are transported between the cleanrooms 100, 200 in a non-cleanroom 300. In the production cleanroom the pouches are produced at production location 110. In a packaging device 115 provided at the packaging position in the production cleanroom, the pouches are collected. The collected pouches are schematically indicated with reference number 120.

In the production cleanroom 100, the collected pouches 120 are collected in a primary package 125, e.g. formed by a plastic bag, which is suitable to be unpacked in a cleanroom. Subsequently, still in the production cleanroom 100, the primary package 125 with the collected pouches 120 is packed into a secondary package 130, e.g. formed by a plastic bag, which is suitable to be stored in a transport box 135 for transport between the cleanrooms 100 and 200, e.g. a cardboard box, which transport box is not suitable to enter a cleanroom.

Subsequently, the secondary package 130, comprising the primary package 125 and the collected pouches 120 is moved out of the production cleanroom 100. Outside, in the non-cleanroom environment, the secondary package 130, comprising the primary package 125 and the collected pouches 120, is packed into the transport box 135. Transport of the transport box 135 is schematically indicated with a fork lift 140, but of course any type of transport is possible: by air, water, rail, trucks, etc. etc.

Once arrived adjacent the remote cleanroom 200 comprising the filling device 210, but still outside the actual cleanroom 200 the transport box 135 and the secondary package 130 are removed from the primary package 125 in which the pouches are collected. This primary package 125 with the pouches 120 is allowed to move into the remote cleanroom 200 comprising the filling device 210. Subsequently, in the cleanroom the primary package 125 is removed from the collected pouches 120. The pouches are subsequently allowed to be filled by the filling device 210.

The invention claimed is:

1. System for the assembly and collection of non-filled spouted pouches to be transported to a remote filling device, comprising:
   an assembly line having one or more stations where spouts and pouches made out of foil are assembled into spouted pouches, and wherein the non-filled spouted pouches are discharged out of the assembly line;
   a conveyor adapted to receive the discharged non-filled spouted pouches from the assembly line;
   multiple storage rails embodied to hold a plurality of spouted pouches which storage rails are positioned at a collection location adjacent the conveyor;
   a pick and place robot provided at the collection location, comprising:
     a camera system operable to perform visual observations on the conveyor, identifying the spouted pouches,
     a gripping device adapted to pick up one or more spouted pouches, and to place each of the spouted pouches into at least one of the multiple storage rails,
     a robot arm connected to the gripping device and adapted to transport the gripping device,
     a controller adapted to control the gripping device and robot arm on the basis of a stacking program and the observations from the camera system;
   a retainer provided at the collection location, adapted to retain at least one row of storage rails side by side, wherein the storage rails are each provided with a longitudinal slot, which storage rails are retained with their slots parallel and vertically orientated and all facing the same direction in one row;
   an unloading device operable to move the multiple storage rails stacked with pouches closer together, and adapted to remove the multiple storage rails with the stacked spouted pouches from the retainer, to form and obtain a compacted assembly of stacked spouted pouches and of multiple storage rails.

2. System according to claim 1, further comprising:
   a packaging device at a packaging position, adapted to pack the storage rails with the stacked spouted pouches into a transportation package, such as a bag or box, e.g. made of plastic or cardboard; and
   a manipulator adapted to transport the multiple storage rails with the stacked spouted pouches from the collection location to the packaging position.

3. System according to claim 1, wherein the system further comprises:
   multiple docking stations at the collection location, each one being provided to dock a retainer; and
   a trolley adapted to remove a retainer from the docking station, and adapted to transport a retainer with the rails and the stacked spouted pouches away from the docking station.

4. System for the assembly and collection of non-filled spouted pouches to be transported to a remote filling device, comprising:
   an assembly line having one or more stations where spouts and pouches made out of foil are assembled into spouted pouches, and wherein the non-filled spouted pouches are discharged out of the assembly line;
   a conveyor adapted to receive the discharged non-filled spouted pouches from the assembly line;
   multiple storage rails embodied to hold a plurality of spouted pouches which storage rails are positioned at a collection location adjacent the conveyor;
   a pick and place robot provided at the collection location, comprising:
     a camera system operable to perform visual observations on the conveyor, identifying the spouted pouches,
     a gripping device adapted to pick up one or more spouted pouches, and to place each of the spouted pouches into at least one of the multiple storage rails,
     a robot arm connected to the gripping device and adapted to transport the gripping device,
     a controller adapted to control the gripping device and robot arm on the basis of a stacking program and the observations from the camera system;
   a retainer provided at the collection location, adapted to retain at least one row of storage rails side by side, wherein the storage rails are each provided with a longitudinal slot, which storage rails are retained with their slots parallel and vertically orientated and all facing the same direction in one row, wherein the retainer is embodied as a storage cassette,
   wherein the cassette comprises an upper and a lower cassette part, and wherein the upper cassette part is removable from the lower cassette part while the lower cassette part maintains the support of the multiple storage rails.

5. System according to claim 1, wherein the pick and place robot system comprises two robots so as to provide two robot arms, each with a gripping device, wherein the pick and place robot system comprises load balancing software to divide the spouted pouches on the conveyor between the robots.

6. System according to claim 1, wherein the gripping device is a dual head gripper comprising two grippers, each one adapted to pick up a spouted pouch from the conveyor, which grippers are arranged in the dual head gripper such that the gripping device is suitable to place the two spouted pouches into two storage rails substantially simultaneously.

7. Method for the assembly and collection of non-filled spouted pouches wherein use is made of a system according to claim 1, comprising the following steps:
   assembling spouts and pouches made out of foil into spouted pouches in an assembly line, discharging the spouted pouches out of the assembly line and dropping them onto a conveyor, operating a camera system of a pick and place robot system provided adjacent the conveyor to perform visual observations on the conveyor, identifying the spouted pouches, on the basis of a stacking program and the observations from the camera system, operating a controller to control a gripping device and robot arm connected to the gripping device to:

pick up one or more spouted pouches;

transport the picked one or more, e.g. two, spouted pouches from the conveyor to at least one of multiple storage rails in which the spouted pouches are stackable;

place the one or more spouted pouches into at least one of the multiple storage rails;

operating the unloading device to move the multiple storage rails stacked with pouches closer together and removing said multiple storage rails with the stacked pouches from the retainer as a compacted assembly.

8. Method according to claim 7, followed by:

transporting the multiple storage rails with the stacked spouted pouches by a manipulator from the collection location to a packaging device at a packaging position;

the packaging device packing the storage rails with the stacked spouted pouches into a transportation package, such as a bag or box, e.g. made of plastic or cardboard.

9. Method according to claim 7, wherein the method is carried out in a cleanroom.

10. Method according to claim 7, followed by transporting the multiple storage rails with the stacked spouted pouches to a remote filling device, removing the spouted pouches from the storage rails, filling the spouted pouches.

11. System according to claim 4, further comprising:

a packaging device at a packaging position, adapted to pack the storage rails with the stacked spouted pouches into a transportation package, such as a bag or box, e.g. made of plastic or cardboard; and a manipulator adapted to transport the multiple storage rails with the stacked spouted pouches from the collection location to the packaging position.

12. System according to claim 4, wherein the system further comprises:

multiple docking stations at the collection location, each one being provided to dock a retainer; and a trolley adapted to remove a retainer from the docking station, and adapted to transport a retainer with the rails and the stacked spouted pouches away from the docking station.

13. System according to claim 4, wherein the pick and place robot system comprises two robots so as to provide two robot arms, each with a gripping device, wherein the pick and place robot system comprises load balancing software to divide the spouted pouches on the conveyor between the robots.

14. System according to claim 4, wherein the gripping device is a dual head gripper comprising two grippers, each one adapted to pick up a spouted pouch from the conveyor, which grippers are arranged in the dual head gripper such that the gripping device is suitable to place the two spouted pouches into two storage rails substantially simultaneously.

15. System according to claim 4, wherein the storage cassette comprises two opposite rows of storage rails, wherein the slots of the rails of one row are substantially opposite the slots of the rails of an opposite row.

16. Method for the assembly and collection of non-filled spouted pouches wherein use is made of a system according to claim 4, comprising the following steps:

assembling spouts and pouches made out of foil into spouted pouches in an assembly line, discharging the spouted pouches out of the assembly line and dropping them onto a conveyor, operating a camera system of a pick and place robot system provided adjacent the conveyor to perform visual observations on the conveyor, identifying the spouted pouches, on the basis of a stacking program and the observations from the camera system, operating a controller to control a gripping device and robot arm connected to the gripping device to:

pick up one or more spouted pouches;

transport the picked one or more, e.g. two, spouted pouches from the conveyor to at least one of multiple storage rails in which the spouted pouches are stackable;

place the one or more spouted pouches into at least one of the multiple storage rails.

17. Method according to claim 16, followed by:

transporting the multiple storage rails with the stacked spouted pouches by a manipulator from the collection location to a packaging device at a packaging position;

the packaging device packing the storage rails with the stacked spouted pouches into a transportation package, such as a bag or box, e.g. made of plastic or cardboard.

18. Method according to preceding claim 17, wherein prior to the transport to the packaging position, an unloading device removes the multiple storage rails with the stacked spouted pouches from a retainer.

19. Method according to claim 18, wherein the unloading device moves the multiple storage rails stacked with spouted pouches closer together, to obtain a compacted package of spouted pouches and storage rails.

20. Method according to claim 16, wherein the method is carried out in a cleanroom.

21. Method according to claim 16, followed by transporting the multiple storage rails with the stacked spouted pouches to a remote filling device, removing the spouted pouches from the storage rails, filling the spouted pouches.

* * * * *